(12) United States Patent
Fonseca et al.

(10) Patent No.: US 10,364,171 B2
(45) Date of Patent: Jul. 30, 2019

(54) PARTIAL BED BACKWASHING FOR PACKED BED REACTOR

(71) Applicant: General Electric Company, Schenectady, NY (US)

(72) Inventors: Nelson Fonseca, Oakville (CA); Douglas Joseph Thompson, Hamilton (CA)

(73) Assignee: BL Technologies, Inc., Minnetonka, MN (US)

( * ) Notice: Subject to any disclaimer, the term of this patent is extended or adjusted under 35 U.S.C. 154(b) by 67 days.

(21) Appl. No.: 14/969,819

(22) Filed: Dec. 15, 2015

(65) Prior Publication Data

US 2016/0297698 A1 Oct. 13, 2016

Related U.S. Application Data

(60) Provisional application No. 62/145,156, filed on Apr. 9, 2015.

(51) Int. Cl.
| | | |
|---|---|---|
| *C02F 1/00* | (2006.01) | |
| *C02F 3/06* | (2006.01) | |
| *C02F 3/30* | (2006.01) | |
| *C02F 101/10* | (2006.01) | |
| *C02F 101/16* | (2006.01) | |
| *C02F 101/20* | (2006.01) | |

(52) U.S. Cl.
CPC ............... *C02F 3/06* (2013.01); *C02F 3/301* (2013.01); *C02F 1/004* (2013.01); *C02F 2101/106* (2013.01); *C02F 2101/163* (2013.01); *C02F 2101/20* (2013.01); *C02F 2303/16* (2013.01)

(58) Field of Classification Search
CPC ........ C02F 3/2826; C02F 3/06; C02F 3/2853; C02F 3/302; C02F 3/305; C02F 3/301
USPC ................................................. 210/617, 618
See application file for complete search history.

(56) References Cited

U.S. PATENT DOCUMENTS

| | | | | |
|---|---|---|---|---|
| 2004/0079691 | A1* | 4/2004 | Jowett | C02F 3/04 210/220 |
| 2013/0126412 | A1* | 5/2013 | Kaldate | C02F 3/286 210/284 |
| 2014/0209526 | A1* | 7/2014 | Pickett | C02F 3/286 210/259 |

FOREIGN PATENT DOCUMENTS

| | | |
|---|---|---|
| JP | H091180 A | 1/1997 |
| WO | 2007012181 A1 | 2/2007 |

OTHER PUBLICATIONS

English Machine translation of JP 091180, pp. 1-16. (Year: 1997).*

(Continued)

*Primary Examiner* — Claire A Norris

(57) ABSTRACT

A media bed reactor may be used to remove selenium from water. An exemplary reactor has a fluid injection system with one or more outlets located within the media bed. The fluid injection system may be connected to a source of gas, liquid or both. In a selenium treatment process, a denitrification zone forms above a selenium-reducing zone in the media bed. Operation of the reactor includes a step of flowing a fluid upwards through only an upper part of the bed. This upper part of the bed preferably contains at least most of the denitrification zone.

6 Claims, 3 Drawing Sheets

(56) References Cited

OTHER PUBLICATIONS

European Search Report issued in connection with corresponding European Application No. EP16164507.2 dated Aug. 8, 2016.
European Application Serial No. 16164507.5, Office Action dated Aug. 9, 2017.
English translation of paragraph [0013] of JPH091180 to Kurita Water Ind Ltd.
European Application Serial No. 16164507.5, Office Action dated Mar. 20, 2019.

* cited by examiner

PARTIAL BED BACKWASHING FOR PACKED BED REACTOR

CROSS-REFERENCE TO RELATED APPLICATIONS

This application is a non-provisional application of U.S. Application Ser. No. 62/145,156, filed Apr. 9, 2015. U.S. Application Ser. No. 62/145,156 is incorporated by reference.

FIELD

This specification relates to packed bed reactors and to water treatment, for example to remove selenium.

BACKGROUND

International Publication Number WO 2007/012181, Apparatus and Method for Treating FGD Blowdown or Similar Liquids, describes a fixed film reactor having a granular activated carbon (GAC) bed. The reactor can be used to treat water containing one or more of nitrate, selenium and sulfates. In one example, feed water flows downwards through the bed. Nitrate is removed in an upper part of the bed by biological conversion to nitrogen gas. Selenium is removed in a lower part of the bed by biological reduction of soluble selenium ions (i.e. selenate and selenite) into particles of elemental selenium. Nitrate is removed first because nitrate is a preferred electron acceptor for biological reduction over selenate or selenite. A suitable reactor is sold by GE Water & Process Technologies under the ABMET trade mark.

Reactors as described above have a grid of porous pipes below the GAC bed and an array of overflow troughs above the GAC bed. Precipitates (including excess biomass and selenium particles) are removed by periodically backwashing the bed with water fed through the under bed pipes and withdrawn by way of the overflow troughs. The backwashing water fluidizes the bed, which expands into a space provided between the top of the bed and the overflow troughs.

Nitrogen gas bubbles also accumulate in the bed. These bubbles are removed by briefly flowing water through the under bed pipes to expand the bed. Gas bubbles are released as the bed expands, and float upwards. In WO 2007/012181, this process is called "bumping" and happens more frequently than backwashing, but requires less time.

INTRODUCTION

When a packed (non-fluidized) media bed reactor is used in a downflow mode to treat a feed stream that contains nitrate, denitrification (reduction of nitrate to nitrogen gas) will occur within the top of the media bed. The nitrogen gas forms bubbles, some of which travel upwards through the bed due to buoyancy forces and escape the bed. However, some of the bubbles become trapped within the packed bed due to the packed nature of the media, as well as its relatively small particle size. In addition, the biomass that performs the denitrification process also resides within the top of the media bed. Both the trapped bubbles and biomass resist flow, resulting in increased pressure drop through the media bed over time. The pressure drop can become severe enough to make a packed bed reactor incapable of achieving reasonable through-put capacity.

In order to remove the nitrogen bubbles and biomass, the media bed may be bumped as described in the background section. However, the inventors have observed that when treating water with a material nitrate concentration, very frequent bumps are required. This requires a significant volume of water, which if reprocessed through the system reduces the effective capacity of the system. The inventors have also observed that frequent bumping disturbs the region of the bed where selenium reduction occurs, causing a reduction in selenium removal.

A media bed reactor described in this specification has a fluid injection system with one or more outlets located within a media bed. The fluid injection system may be connected to a source of gas, liquid or both. In a selenium-reducing reactor, the one or more outlets are located near an expected interface between a denitrification zone and a selenium reduction zone in the bed. The fluid injection system may also have one or more outlets located at a second elevation, such as near or below the bottom of the bed.

In a process described in this specification, a media bed reactor is used to removed nitrate and selenium from water. A denitrification zone and a selenium reducing zone form in the bed. Operation of the reactor includes a step of flowing a fluid upwards through only an upper part of the bed. This upper part of the bed preferably contains at least most of the denitrification zone. The fluid may be liquid, gas, or a two-phase gas-liquid mixture. The process may also include a step of backwashing substantially all of the bed.

DETAILED DESCRIPTION

International Publication Number WO 2007/012181, Apparatus and Method for Treating FGD Blowdown or Similar Liquids, is incorporated by reference.

Figure 1:
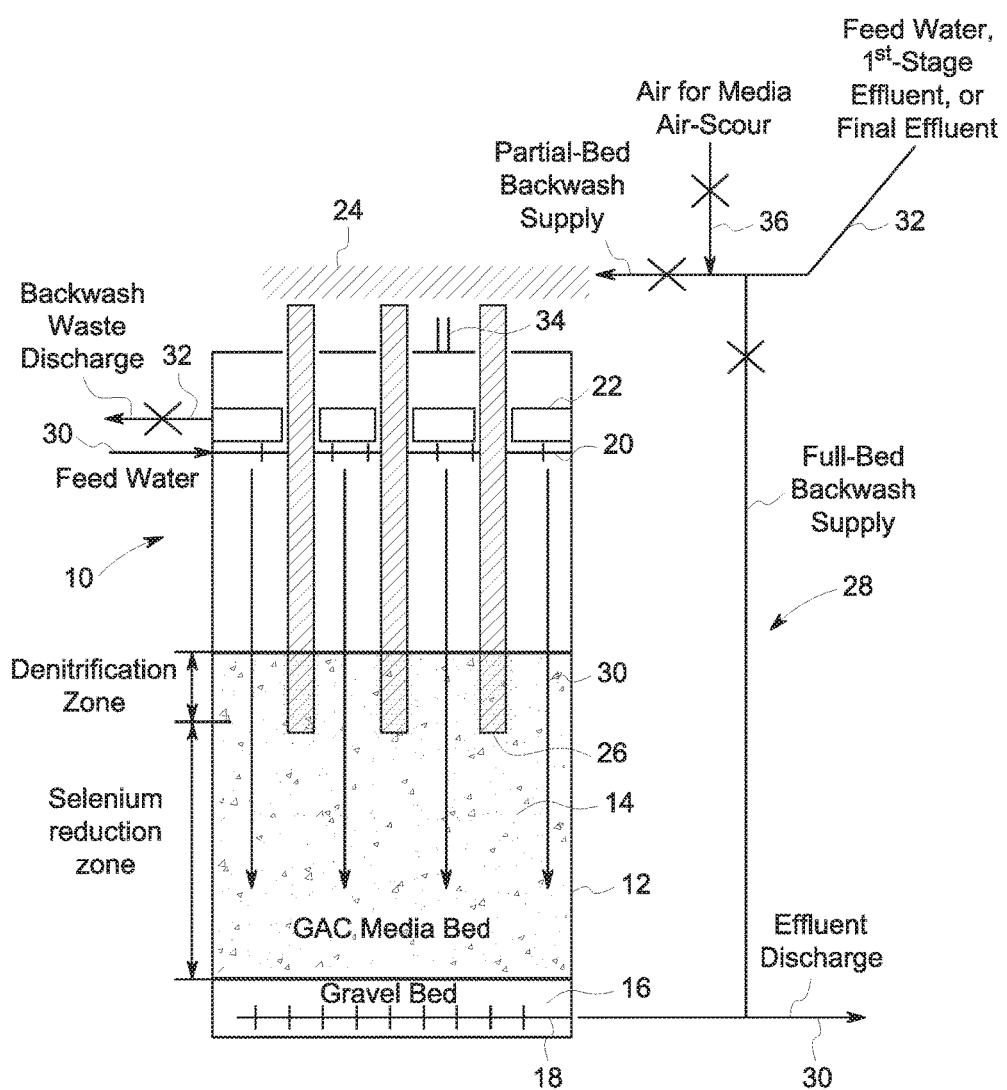
FIG. 1 is a schematic cross section of a media bed reactor operating in production mode.
Figure 2:
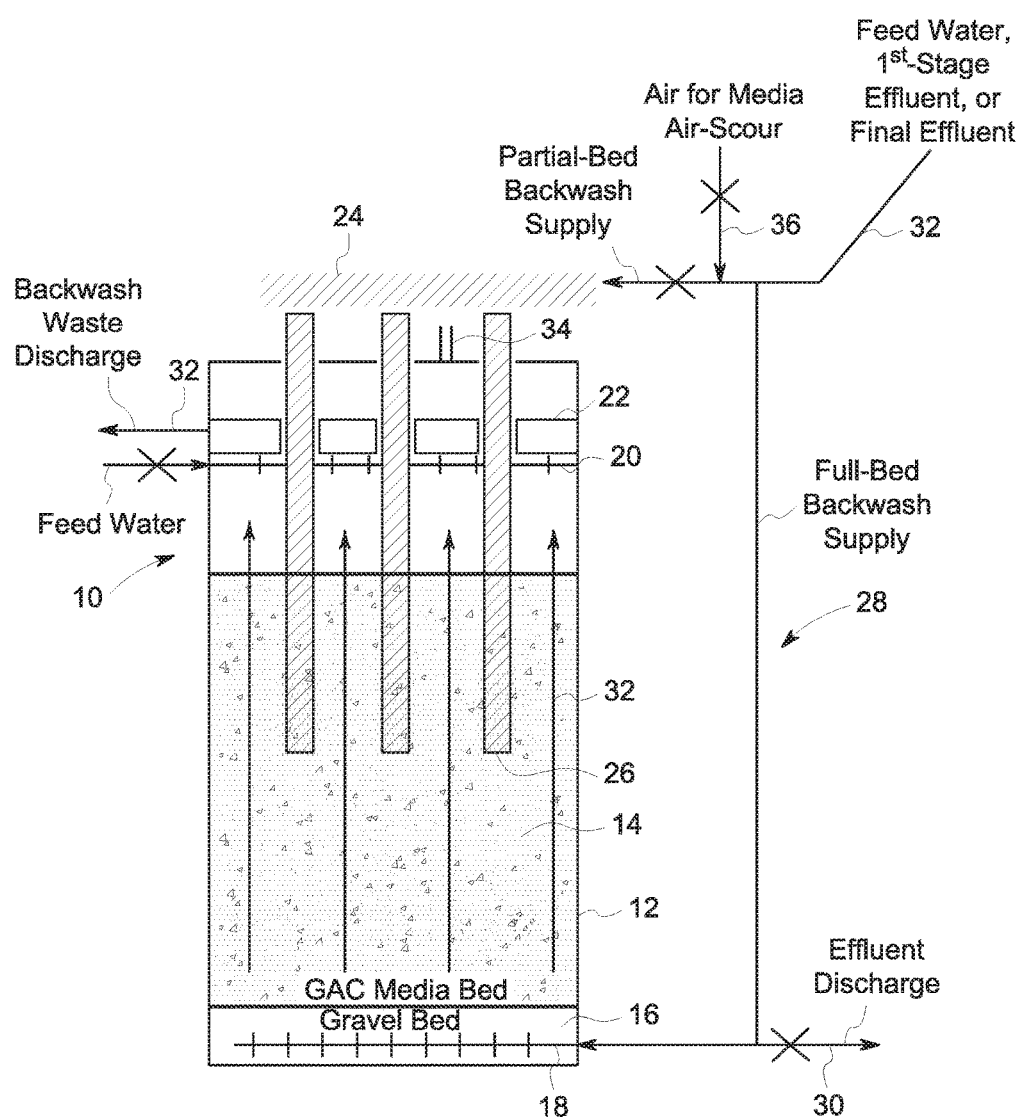
FIG. 2 is a schematic cross section of the reactor of FIG. 1 operating in full-bed backwash mode.
Figure 3:
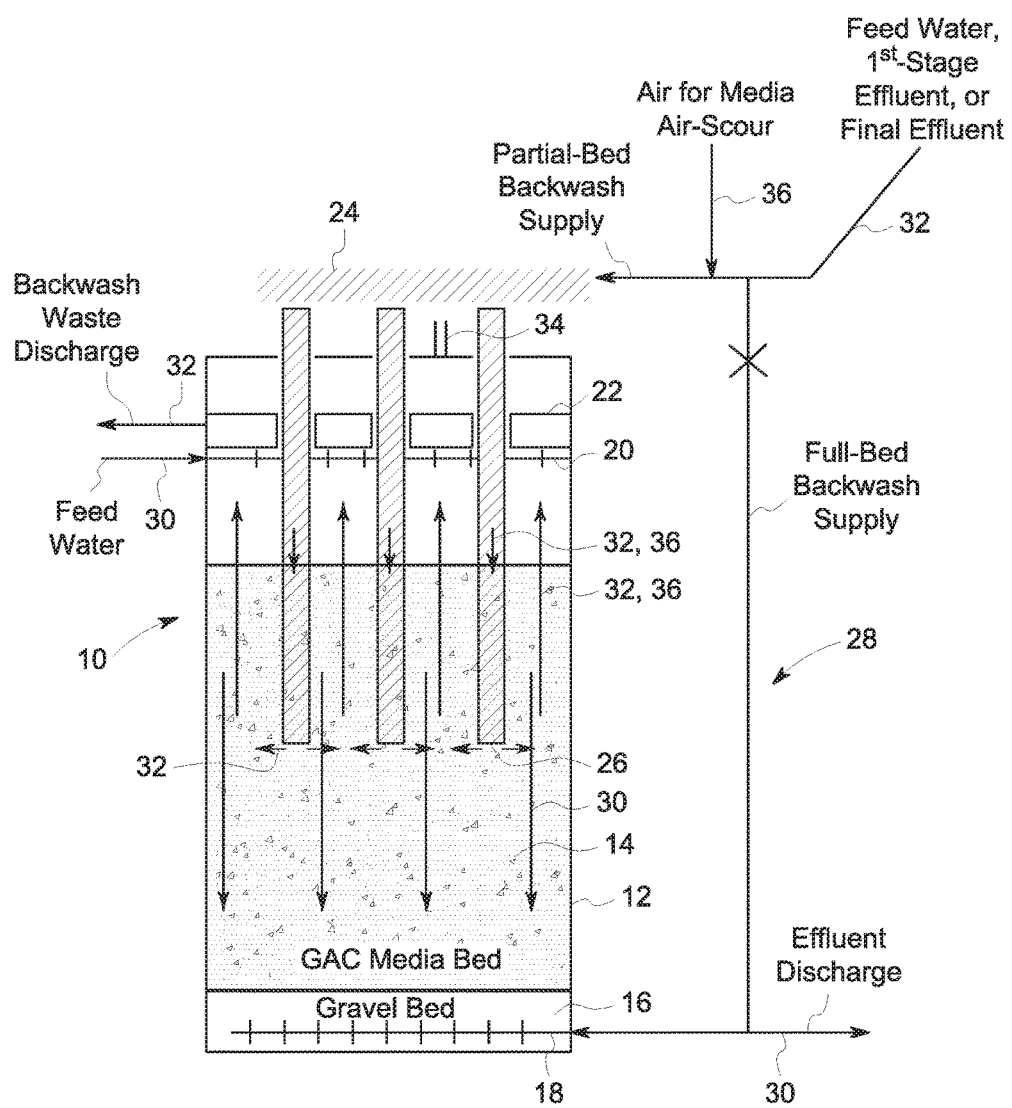
FIG. 3 is a schematic cross section of the reactor of FIG. 1 operating in partial bed backwash mode.

Referring to FIGS. 1 to 3, a reactor 10 has a tank 12 partially filled with a media bed 14. The media bed 14 may be made up of, for example, granular activated carbon (GAC) particles. The reactor 10 also has a gravel bed 16 below the media bed 14. The gravel bed 16 contains a lower distribution pipe 18. An upper distribution pipe 20 is located above the media bed 14. A back wash trough 22 is located above the upper distribution pipe 20. A mid-bed distribution pipe 24 has outlets 26 located within the bed. In the example shown, the mid-bed distribution pipe 24 is located outside of the tank 12 and the outlets 26 are provided at the ends of pipe segments extending from the mid-bed distribution pipe 24 into the media bed 14. Alternatively, the mid-bed distribution pipe 24 could be located within the media bed 14, and the outlets 26 could be holes in the mid-bed distribution pipe 24.

The outlets 26 may be located, for example, within the central 80% or 60% of the height of the packed media bed 14, preferably also in the upper half of the packed media bed 14. Preferably, the outlets 26 are located near the expected elevation of an interface between a denitrification zone and a selenium reduction zone in the media bed 14. About 90% or more of the nitrate removal for the reactor 10 as a whole occurs in the denitrification zone.

The lower distribution pipe 18, mid-bed distribution pipe 24 and associated ancillary components (i.e. pipes outside of the tank 12, valves and valve controllers) make up a fluid injection system 28. In this example, the lower distribution pipe 18 is also used to withdraw treated effluent from the reactor 10. Alternatively, a separate effluent collection pipe may be used. The distribution pipes 18, 20, 24 described above may optionally be replaced with other structures having either fewer (optionally just one), or more, inlet or outlet openings.

FIG. 1 shows operation of the reactor 10 in a production mode. Water 30 to be treated is fed into the reactor 10 through the upper distribution pipe 20. The water flows downwards through the media bed 14. During a start up or inoculation period, bacteria adhere to individual particles of the media and develop a biofilm. Thereafter, water 30 flowing through the bed comes into contact with the biofilm.

As the water 30 comes into contact with the biofilm, various biological processes may take place that result in the transformation of one or more constituents present in the feed water 30 such as oxygen, nitrate, selenate, selenite, and sulfate, among others. Treated water 30 exits the media bed 14 and is collected in the lower distribution pipe 18. The collected water 30 is discharged from the reactor 10 as treated effluent. Optionally, the effluent may be treated further before it is used or discharged.

FIG. 2 shows operation of the reactor 10 in a full-bed backwash mode. A full bed backwash may be performed, for example, between once a week and once a month. During the full-bed backwash, the flow of water 30 as in the production mode is stopped. Rinse water 32 is provided to the lower distribution pipe 18. The rinse water 32 may be, for example, feed water (as in feed water 30) or treated effluent from the reactor 10 or any other part of a treatment system including the reactor 10. The rinse water flows upwards through the tank 12 and fluidizes essentially all of the media bed 14. Bubbles and solids are released from the media bed 14 and exit, with rinse water 32, through the backwash trough 22. Optionally, gasses that collect above the backwash trough 22 may also be removed through a vent 34 at the top of the reactor 10. Discharged rinse water 32 is typically treated, for example to separate out entrained solids, and then returned to the head of the water treatment system.

FIG. 3 shows operation of the reactor 10 in a partial bed backwash mode. A partial bed backwash may be performed, for example, from 0.5 to 5 times per day. During the partial-bed backwash, the flow of water 30 as in the production mode may be either stopped or continue. Rinse water 32 or a gas 36 (typically air), or both, are provided to the mid-bed distribution pipe 24. Rinse water 32, or gas 36, or a two-phase flow of gas 36 and rinse water 32 possibly with some entrained feed water 30, flows upwards through and preferably fluidizes only an upper part of the media bed 14 located above outlets 26. Bubbles and solids are released from the upper part of the media bed 14 and exit, with rinse water 32, through the backwash trough 22, and optionally through vent 34. Discharged rinse water 32, if any, is typically treated as described above.

The partial bed backwashing is a more efficient way, relative to full bed backwashing, to remove gas bubbles, and possibly biomass, trapped within the top portion of the media bed 14. Most, optionally 90% or more, of the denitrification occurs in this portion of the media bed 14. Less water is required to perform a partial-bed backwash as compared to a full-bed backwash which, when treated effluent is used as the rinse water, increases the net flow through the reactor 10. A partial bed backwash also leaves a portion, preferably most, of the media bed 14 undisturbed, which improves selenium reduction relative to a process with bumping at the same frequency. Selenium and selenium reducing organisms accumulate in the media bed 14 at lower rates than nitrogen gas bubbles or dentrifying biomass, so bumping can be omitted without causing the lower part of the media bed 14 to plug. Partial bed backwashing is particularly useful when the reactor 10 is used to treat water 30 with material nitrate concentration.

The reactor 10 has been described above in use to remove nitrogen and selenium from water. Alternatively, the reactor 10 could be used to remove other compounds from water by way of biological or other mechanisms. For example, the reactor 10 might be used to remove nitrate generally throughout the media bed 14, with an upper part of the media bed 14 also filtering solid particles from the water.

We claim:

1. A reactor comprising,
    a media bed comprising a denitrification zone above a selenium reducing zone; and,
    a fluid injection system with one or more outlets located within the media bed
    wherein at least part of the denitrification zone is located above the one or more outlets that are located within the media bed.

2. The reactor of claim 1 wherein the fluid injection system is connected to a source of a gas and a source of water.

3. The reactor of claim 1, wherein the one or more outlets are located within the central 80% of the height of the media bed.

4. The reactor of claim 1 wherein the fluid injection system further comprises one or more additional outlets located below or near the bottom of the media bed.

5. A process for treating water, comprising steps of
    flowing the water downwards through a media bed comprising a denitrification zone above a selenium reducing zone; and,
    backwashing an upper portion of the media bed by flowing a fluid upwards though the upper portion of the media bed.

6. The process of claim 5 wherein the upper portion of the media bed contains at least part of the denitrification zone.

* * * * *